though conventional single spring suspensions of the same over-all load deflection range would have harder suspensions.

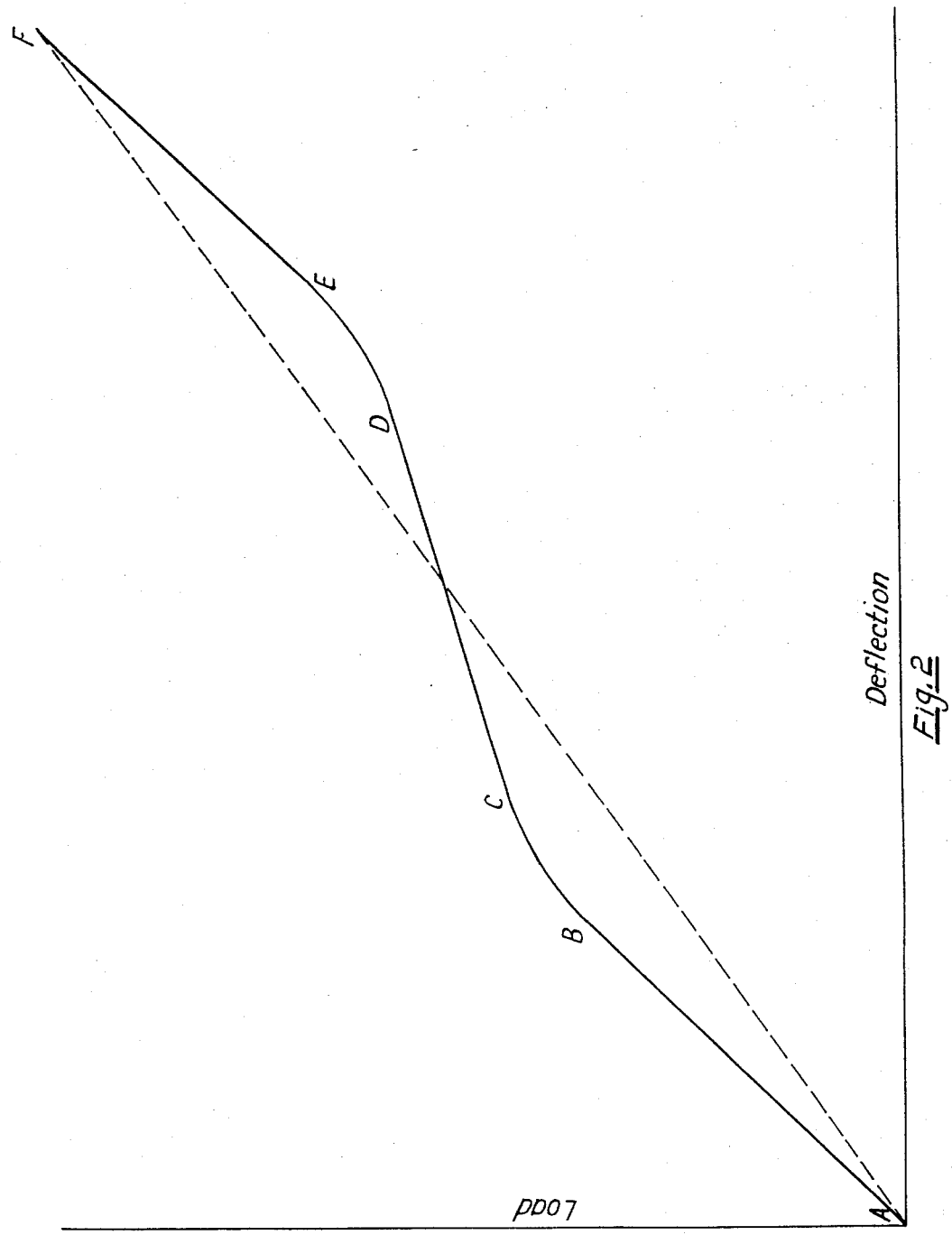

United States Patent Office 3,417,986
Patented Dec. 24, 1968

3,417,986
VARIABLE RATE SUSPENSION
William Alfred Fuke, Witham, England, assignor to Ford Motor Company, Dearborn, Mich., a corporation of Delaware
Filed Sept. 28, 1966, Ser. No. 582,614
Claims priority, application Great Britain, Oct. 1, 1965, 41,694/65
11 Claims. (Cl. 267—33)

ABSTRACT OF THE DISCLOSURE

A suspension means for an automotive vehicle having a primary spring element and a preloaded secondary spring element. The primary spring operates during the entire range of jounce and rebound. The secondary spring operates in series with the primary spring during a selected portion of the deflection range of the primary spring.

---

Figure 1:
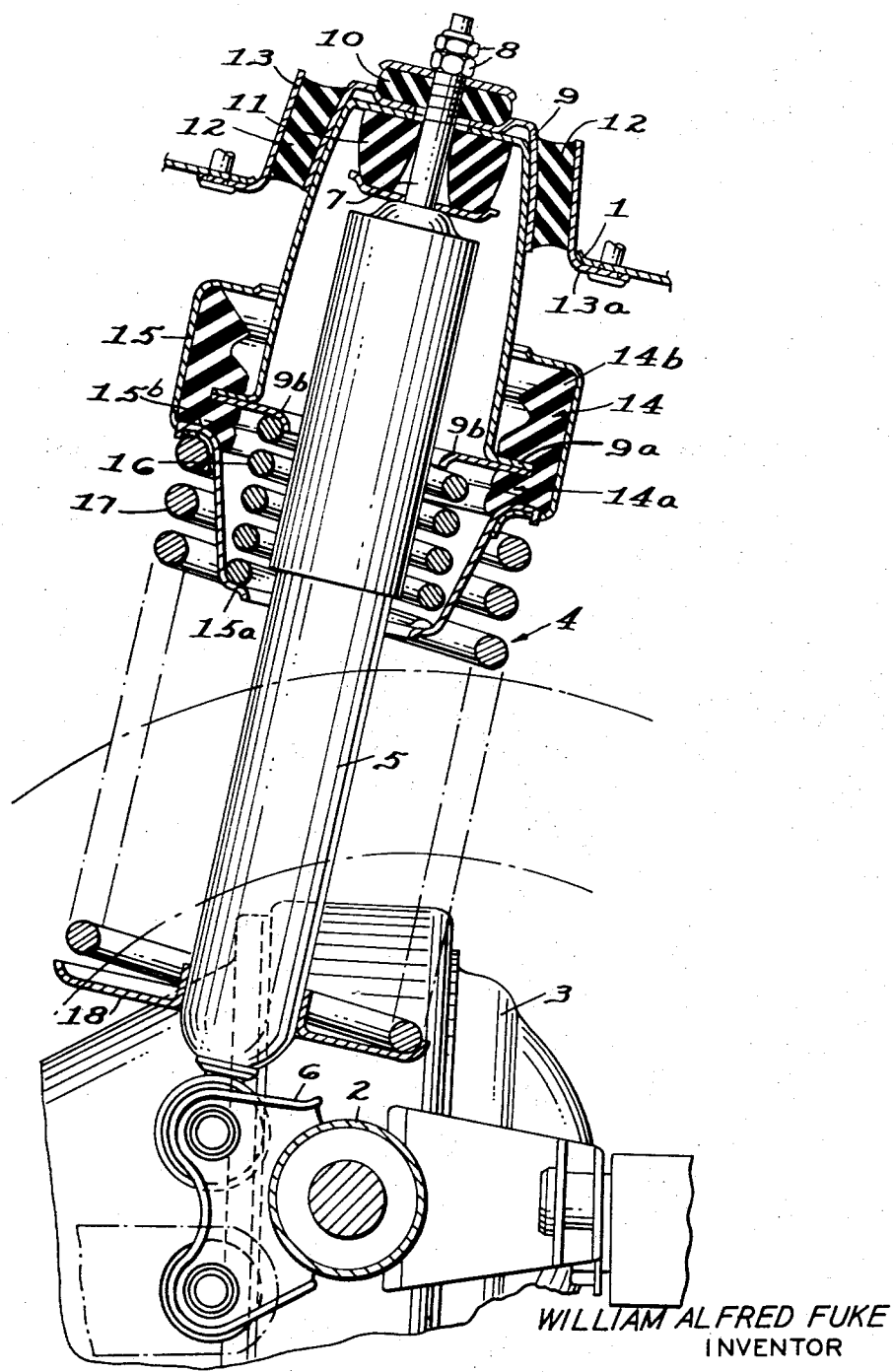

This invention relates to motor vehicles and more particularly to motor vehicles suspensions and to spring units for use in motor vehicle suspensions.

In a motor vehicle wheel suspension, the frequency of any vibrations or oscillations which are set up in the suspension as a result of the vehicle travelling over an uneven surface, for example, is proportional to the load on the spring and to the spring rate. Thus, a fully laden vehicle or a vehicle with "soft" suspension will be subjected to lower frequency vibrations or oscillations than a partially laden vehicle or a vehicle with "hard" suspension.

In any suspension, the deflection range between jounce and rebound is limited by design considerations. Moreover, the spring must be capable of sustaining a given load range within this deflection range. Consequently, if a single spring is used then it must have a minimum rate in order to comply with these deflections and load requirements. This can mean that the spring is then too "hard" and gives rise to undesirably high frequency oscillations especially under lightly laden conditions.

This invention is concerned with a suspension which will satisfy the load deflection requirements, but at the same time, reduce the frequency of the oscillations within the laden range of the vehicle.

According to the present invention, a motor vehicle has a spring unit connected between a sprung mass and an unsprung mass of the vehicle, and the spring unit has the following combination of features:

(A) A first spring is preloaded between the sprung mass of the vehicle and a member which is supported by the sprung mass but is movable relatively to it;
(B) A second spring is located between the member and the unsprung mass of the vehicle;
(C) In operation the spring unit has the following characteristics:
  (i) A jounce load up to the value of the preload on the first spring deflects only the second spring;
  (ii) A jounce load greater than the preload but less than the load required to fully deflect the first spring deflects both the first and second springs;
  (iii) A jounce load greater than the load required to fully deflect the first spring further deflects only the second spring.

An embodiment of the invention will now be described with reference to the accompanying drawings, in which:

FIGURE 1 is a cross-sectional view of a spring unit according to the invention installed in a vehicle; and FIGURE 2 is a graph showing the load deflection characteristics of the spring unit of FIGURE 1.

A motor vehicle has a sprung body 1 and an unsprung axle 2 and differential 3. A spring unit 4 is connected between the body 1 and the axle 2 to give the suspension the variable load deflection characteristic shown in FIGURE 2.

The spring unit 4 comprises a hydraulic telescopic shock absorber 5 which has its top end secured indirectly to the body 1 and its bottom end secured to a bracket 6 on the axle 2.

The top end of the shock absorber 5 has a threaded stud 7 which is secured to a first hollow frusto-conical member 9 by nuts 8, rubber washers 10, 11 being provided to dampen vibrations.

A rubber annulus 12 is bonded to the member 9 and has a second frusto-conical member 13 bonded to it. The member 13 has a flange 13a by which it is secured to the body 1.

The member 9 has a radially outwardly extending flange 9a and a radially inwardly extending flange 9b. An annular rubber block 14 encloses the flange 9a and a third member 15 encloses the rubber block 14. The member 15 has a radially inwardly extending flange 15a.

A first coil spring 16 is precompressed and held between the flanges 9b and 15a. A second coil spring 17 is located between the member 15 and a cup-shaped annulus 18 which is secured to the lower end of the shock absorber 5.

Operation of spring unit

When the vehicle is unladen, the load on the spring 17 is less than the preload of the spring 16 so that only the spring 17 is deflected. As the jounce load increases, the spring 17 is compressed between the annulus 18 and the step 15b of the member 15. The member 15 remains stationary relatively to the body 1 while the load on the spring 17 is less than the preload on the spring 16. As long as this is so, the spring unit has a rate equal to the spring 17 by itself. When the jounce load on the spring 17 reaches a value indicated by B on the graph, the rubber 14a begins to compress to allow the member 15 to move upwardly relatively to the body 1. When the rubber has been compressed to the point C on the graph, the load exerted by the spring 17 on the member 15 is equal to the preload on the spring 16. Consequently, a further increase in jounce load on the spring 17 causes the spring 16 to deflect. From this point to the point D on the graph where the spring 16 is fully compressed, the spring unit has a rate equivalent to the rates of the springs 16 and 17 in series, that is, a rate lower than the spring 17 by itself. FIGURE 1 illustrates the relationship of the elements during a point on the portion CD of the graph curve of FIGURE 2.

After the spring 16 has been fully compressed, further jounce load on the spring 17 causes the portion 14b of the rubber 14 to be compressed to give the portion DE of the graph. After the portion 14b has been compressed, the spring unit then again has only the rate of spring 17 for further jounce loads as indicated by portion EF of the graph.

The spring unit must have a certain load range and deflection range between points A and F determined by design considerations. The broken straight line AF indicates the equivalent single spring which will give the desired load deflection range. It will be noted that this single spring has a greater rate than the spring unit within the range CD. Consequently, if the rates of the springs 16 and 17 and the preload on spring 16 are chosen to make the range CD correspond to the normal laden range of the vehicle, the vehicle will have "softer" suspensions within its laden range than could be obtained with a single spring having the same over-all load deflection range.

The rates of the springs 16 and 17 and the preload on the spring 16 are chosen in accordance with the load requirements of the particular vehicle to which the spring unit is to be fitted. Two units would normally be fitted one on each end of the axle 2.

The rubber blocks 15 serve to give a smooth transition from the single rate of the spring 17 (AB) to the combined rate of the springs 16 and 17 in series (CD) and then back again to the single rate of spring 17 (EF).

I claim:

1. A suspension system for a motor vehicle comprising a sprung component, an unsprung component and suspesion means connecting said components, said means comprising a first spring seat connected to said unsprung component, a spring having one portion connected to said seat. An intermediate member connected to another portion of said spring, a second spring seat connected to said sprung component, a second spring interposed between said intermediate member and said second spring seat, means connecting said second spring seat and said intermediate member constructed to preload said second spring.

2. A vehicle suspension system according to claim 1 and including:
said second spring having a higher spring rate than said first spring, said second spring seat having an annular flange, said intermediate member having an annular channel, said connecting means comprising an annular rubber member surrounding said annular flange and fitted within said channel.

3. A vehicle suspension system according to claim 1 and including:
a telescopic hydraulic shock absorber, said first spring seat being connected to one end of said shock absorber, said second spring seat being connected to the other end of said shock absorber, said first and second springs being coil springs concentrically disposed about the axis of said shock absorber.

4. A vehicle suspension system according to claim 1 and including:
said second spring having a higher spring rate than said first spring, said second spring seat having an annular flange, said intermediate member having an annular channel, said connecting means comprising an annular rubber member surrounding said annular flange and fitted within said channel, a telescopic hydraulic shock absorber, said first spring seat being connected to one end of said shock absorber, said second spring seat being connected to the other end of said shock absorber, said first and second springs being coil springs concentrically disposed about the axis of said shock absorber.

5. A vehicle suspension system according to claim 1 and including:
said connecting means comprising an annular rubber member engaging said intermediate member and said second spring seat.

6. A vehicle suspension system according to claim 1 and including:
said second spring having a higher spring rate than said first spring.

7. A vehicle suspension system according to claim 1 and including:
said second spring seat having an annular flange, said intermediate member having an annular channel, said connecting means comprising an annular rubber member surrounding said annular flange and fitted within said channel.

8. A vehicle suspension system according to claim 1 and including:
said first and second springs being concentrically disposed coil springs.

9. A vehicle suspension system according to claim 1 and including:
said connecting means comprising a resilient member engaging said intermediate member and said second spring seat.

10. A vehicle suspension system according to claim 1 and including:
said connecting means comprising a resilient member secured to said intermediate member and said second spring seat under all conditions of deflection of said first and second springs.

11. A suspension system for a motor vehicle comprising a sprung component, an unsprung component and a suspension means connecting said components,
said means comprising a first spring seat connected to said unsprung component, a second spring seat connected to said sprung component,
a first spring means having one end engaging said first spring seat, a second spring means having one end engaging said second spring seat,
an intermediate member having a pair of spring seats, one of said pair of spring seats engaging the other end of said first spring means, the other of said pair of spring seats engaging the other end of said second spring means,
means connecting one of said first and second spring seats and said intermediate member constructed to preload one of said spring means,
one of said spring seats having an annular flange, another of said spring seats having an annular channel receiving said annular flange,
said connecting means comprising an annular elastomeric member surrounding said annular flange and fitted within said channel.

References Cited

UNITED STATES PATENTS

| | | | |
|---|---|---|---|
| 2,280,429 | 4/1942 | Glick | 267—34 |
| 2,592,391 | 4/1952 | Butterfield | 267—34 |
| 3,297,312 | 1/1967 | Hines | 267—34 |

FOREIGN PATENTS

| | | |
|---|---|---|
| 958,083 | 2/1957 | Germany. |
| 1,173,569 | 2/1959 | France. |

BENJAMIN HERSH, *Primary Examiner.*

L. D. MORRIS, JR., *Assistant Examiner.*